US012640888B2

(12) United States Patent
Li

(10) Patent No.: US 12,640,888 B2
(45) Date of Patent: May 26, 2026

(54) BEAM INDICATION METHOD, BEAM INDICATION APPARATUS AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 18/269,732

(22) PCT Filed: Dec. 29, 2020

(86) PCT No.: PCT/CN2020/140943
§ 371 (c)(1),
(2) Date: Jun. 26, 2023

(87) PCT Pub. No.: WO2022/141074
PCT Pub. Date: Jul. 7, 2022

(65) Prior Publication Data
US 2024/0063979 A1 Feb. 22, 2024

(51) Int. Cl.
*H04L 5/00* (2006.01)
*H04B 7/06* (2006.01)
*H04W 72/232* (2023.01)

(52) U.S. Cl.
CPC ......... *H04L 5/0053* (2013.01); *H04W 72/232* (2023.01)

(58) Field of Classification Search
CPC .. H04L 5/0053; H04L 5/0023; H04W 72/232; H04B 7/0639; H04B 7/06968
See application file for complete search history.

(56) References Cited

U.S. PATENT DOCUMENTS

2020/0322944 A1* 10/2020 Soriaga ............... H04W 72/542
2020/0328849 A1* 10/2020 Noh ...................... H04L 1/1812
2023/0370238 A1* 11/2023 Liu ...................... H04B 7/0639

FOREIGN PATENT DOCUMENTS

CN          111385078 A      7/2020
CN          112118082 A      12/2020
WO    WO 2020164601 A1      8/2020

OTHER PUBLICATIONS

3GPP TSG-RAN WG2 Meeting#120, R2-2212646 Title:Certification on the support of DL-PRS recepting with 480/960kHZ SCS in FR2-2 (Year: 2022).*
3GPP TSG-RAN WG1 Meeting#95, R1-1813485 Title:Remaining issues on multi-antenna scheme (Year: 2018).*
(Continued)

*Primary Examiner* — Faruk Hamza
*Assistant Examiner* — Abusayeed M Haque
(74) *Attorney, Agent, or Firm* — Cozen O'Connor

(57) ABSTRACT

A method for beam indication performed by a terminal includes: receiving first indication information, wherein the first indication information is configured to indicate one or more common transmission configuration indication (TCI) states, the common TCI state comprises an uplink and downlink (UL & DL) common TCI state applicable to UL and DL, or at least one of a UL common TCI state applicable to UL or a DL common TCI state applicable to DL.

14 Claims, 3 Drawing Sheets sending second indication information, wherein the second indication information is configured to indicate a channel and/or a reference signal to which the common TCI state is applicable ⟍S51

(56)          References Cited

OTHER PUBLICATIONS

Interdigital, Inc. "Discussions on Multi-beam Enhancement", 3GPP TSG RAN WG1 #103-e, R1-2007626, Aug. 2020, 12 pages.
CATT "Discussion on enhancement on multi-beam operation" 3GPP TSG RAN WG1 #103-e, R1-2007824, Oct. 2020, 10 pages.
Chinese Patent Application No. 202080004456.9, Office Action dated Sep. 2, 2022, 9 pages.
Chinese Patent Application No. 202080004456.9, English translation of Office Action dated Sep. 2, 2022, 8 pages.
PCT/CN2020/140943, International Search Report and Written Opinion dated Sep. 28, 2021, 6 pages.
PCT/CN2020/140943, English translation of International Search Report and Written Opinion dated Sep. 28, 2021,8 pages.
European Patent Application No. 20967422.5, Search Report and Opinion dated Aug. 26, 2024, 10 pages.
NTT DOCOMO, INC "Discussion on multi-beam operation" 3GPP TSG RAN WG1 #103-e, R1-2009174, Oct.-Nov. 2020, 22 pages.

* cited by examiner

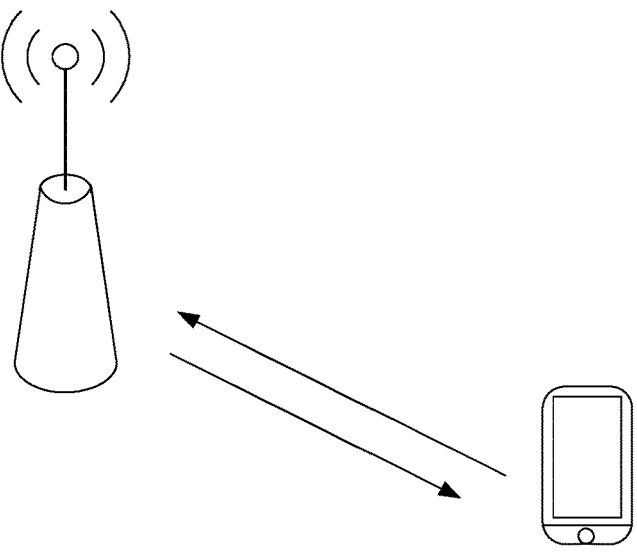

FIG. 1

| receiving first indication information, wherein the first indication information is configured to indicate one or more common transmission configuration indication (TCI) states | S11 |

FIG. 2

| receiving second indication information, wherein the second indication information is configured to indicate a channel and/or a reference signal to which the common TCI state is applicable | S21 |

FIG. 3

| receiving third indication information, wherein the third indication information is configured to indicate that the first indication information indicates common TCI states of the one or more TRPs | S31 |

FIG. 4

| sending first indication information, wherein the first indication information is configured to indicate one or more common transmission configuration indication (TCI) states | S41 |

FIG. 5

| sending second indication information, wherein the second indication information is configured to indicate a channel and/or a reference signal to which the common TCI state is applicable | S51 |

FIG. 6

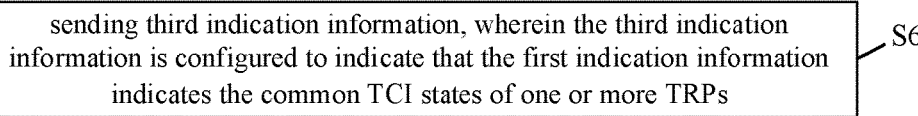

sending third indication information, wherein the third indication information is configured to indicate that the first indication information indicates the common TCI states of one or more TRPs ⎯S61

FIG. 7

<u>100</u> receiving unit ⎯101

FIG. 8

<u>200</u> sending unit ⎯201

304 memory

302 processing component processor

320

316 communication component

306 power component

308 multimedia component

314 sensor component

310 audio component input/output (I/O) interface

BEAM INDICATION METHOD, BEAM INDICATION APPARATUS AND STORAGE MEDIUM

CROSS-REFERENCE TO RELATED APPLICATION

This application is the U.S. national phase application of International Application No. PCT/CN2020/140943, filed on Dec. 29, 2020, the entire disclosure of which is incorporated herein by reference.

TECHNICAL FIELD

The disclosure relates to a field of wireless communication technology, and in particular to a method and an apparatus for beam indication, and a storage medium.

BACKGROUND

In wireless communication networks using the new radio (NR) technology, for example, when a communication frequency band is in the frequency range 2, since a high-frequency channel attenuates quickly, beam-based transmission and reception is used in order to ensure adequate coverage.

In the related art, beams for a physical downlink control channel (PDCCH), a physical downlink shared channel (PDSCH), a physical uplink shared channel (PUSCH), a physical uplink control channel (PUCCH) and each uplink and downlink reference signal are independently indicated. The medium access control (MAC) control element (CE) is used by the PDCCH and PUCCH to indicate their respective beams. The downlink control information (DCI) signaling is used by the PDSCH and the PUSCH to indicate their respective beams. Currently, in order to reduce signaling overhead, a common beam is used for indication. The common beam may be used to indicate uplink and downlink channels and/or reference signals of a terminal. However, performing common beam indication is not fully developed.

SUMMARY

According to a first aspect of the disclosure, a method for beam indication is performed by a terminal. The method includes: receiving first indication information, in which the first indication information is configured to indicate one or more common transmission configuration indication (TCI) states, the common TCI state includes an uplink and downlink (UL & DL) common TCI state applicable to UL and DL, or at least one of a UL common TCI state applicable to UL or a DL common TCI state applicable to DL.

According to a second aspect of the disclosure, a method for beam indication is performed by a network device. The method includes: sending first indication information, in which the first indication information is configured to indicate one or more common TCI states, the common TCI state includes a UL & DL common TCI state applicable to UL and DL, or at least one of a UL common TCI state applicable to UL or a DL common TCI state applicable to DL.

According to a third aspect of the disclosure, a terminal is provided, including: a processor; and a memory storing instructions executable by the processor. The processor is configured to: receive first indication information, in which the first indication information is configured to indicate one or more common TCI states, the common TCI state comprises a UL & DL common TCI state applicable to UL and DL, or at least one of a UL common TCI state applicable to UL or a DL common TCI state applicable to DL.

It should be understood that both the foregoing general description and the following detailed description are exemplary and explanatory only, which are not limited to the present disclosure.

BRIEF DESCRIPTION OF THE DRAWINGS

The accompanying drawings, which are incorporated in and constitute a part of this specification, illustrate embodiments consistent with the disclosure and together with the specification serve to explain principles of the embodiments of the disclosure.

FIG. 1 is a structural schematic diagram illustrating a wireless communication system according to an embodiment.

FIG. 2 is a flowchart illustrating a method for beam indication applied to a terminal according to an embodiment.

FIG. 3 is a flowchart illustrating a method for beam indication applied to a terminal according to an embodiment.

FIG. 4 is a flowchart illustrating a method for beam indication applied to a terminal according to an embodiment.

FIG. 5 is a flowchart illustrating a method for beam indication applied to a network device according to an embodiment.

FIG. 6 is a flowchart illustrating a method for beam indication applied to a network device according to an embodiment.

FIG. 7 is a flowchart illustrating a method for beam indication applied to a network device according to an embodiment.

FIG. 8 is a block diagram illustrating an apparatus for beam indication applied to a terminal according to an embodiment.

FIG. 9 is a block diagram illustrating an apparatus for beam indication applied to a network device according to an embodiment.

FIG. 10 is a block diagram illustrating a device for beam indication according to an embodiment.

DETAILED DESCRIPTION

Figure 11:
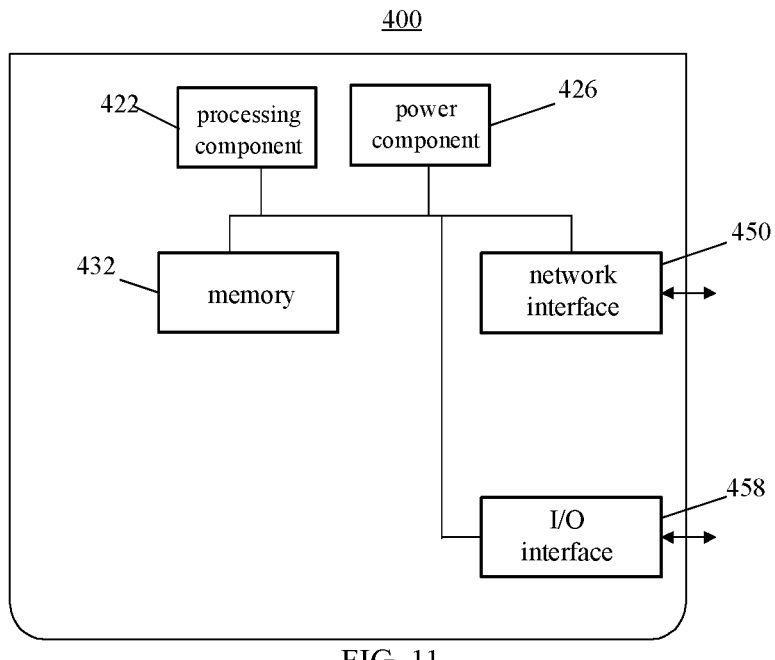
FIG. 11 is a block diagram illustrating a device for beam indication according to an embodiment.

Embodiments will be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the disclosure. Rather, they are merely examples of apparatuses and methods consistent with some aspects of the disclosure, as recited in the appended claims.

The method for beam indication according to the embodiments of the present disclosure may be applied to the wireless communication system shown in FIG. 1. Referring to FIG. 1, the wireless communication system includes a terminal and a network device. The terminal is connected to the network device through wireless resources, and performs data transmission and reception.

It may be understood that the wireless communication system shown in FIG. 1 is only for schematic illustration, and the wireless communication system may also include other network devices, such as core network devices, wireless relay devices, and wireless backhaul devices, etc. which are not shown in FIG. 1. A number of network devices and a number of terminals included in the wireless communication system are not limited in the embodiments of the present disclosure.

It may be further understood that, the wireless communication system in the embodiments of the present disclosure is a network that provides a wireless communication function. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), carrier sense multiple access with collision avoidance. According to factors of different networks (such as, capacity, speed, and delay), the network may be divided into a 2nd generation (2G) network, a 3G network, a 4G network or a future evolution network (such as a 5G network). The 5G network can also be called a new radio (NR) network. For convenience of description, the present disclosure sometimes simply refers to a wireless communication network as a network.

Further, the network device involved in this disclosure may also be referred to as a radio access network device. The radio access network device may be: a base station, an evolved node B (eNB), a home base station, an access point (AP) in a wireless fidelity (WIFI) system, a wireless relay node, a wireless backhaul node, a transmission point (TP) or a transmission and reception point (TRP), etc. The radio access network device may also be a gNB in an NR system, or a component or a part of device that constitutes a base station. When it is a vehicle-to-everything (V2X) communication system, the network device may also be a vehicle-mounted device. It should be understood that, the specific technology and specific device form adopted by the network device is not limited in the embodiments of the present disclosure.

Further, the terminal involved in this disclosure may also be referred to as a terminal device, user equipment (UE), a mobile station (MS), a mobile terminal (MT), etc., which is a device providing voice and/or data connectivity. For example, the terminal may be a handheld device with a wireless connection function, a vehicle-mounted device, and the like. At present, examples of some terminals are: a mobile phone, a pocket personal computer (PPC), a palmtop computer, a personal digital assistant (PDA), a notebook computer, a tablet computer, a wearable device, or a vehicle-mounted device, etc. In addition, when it is a vehicle-to-everything (V2X) communication system, the terminal device may also be a vehicle-mounted device. It should be understood that, the specific technology and specific device form adopted by the terminal is not limited in the embodiments of the present disclosure.

In the present disclosure, data transmission is performed between the network device and the terminal based on a beam. During the beam-based data transmission, in order to reduce a signaling overhead, a common beam is used to indicate a channel and/or a reference signal. In the related art, the common beam may indicate uplink transmission or downlink transmission separately, or jointly indicate uplink transmission and downlink transmission. For example, if the network device indicates a common beam used for downlink, the common beam may be used to indicate a physical downlink shared channel (PDSCH) and all or a part of physical downlink control channel (PDCCH) (such as a UE dedicated PDCCH) of the terminal. If the network device indicates a common beam used for uplink, the common beam may be used to indicate a physical uplink shared channel (PUSCH) and all or a part of physical uplink control channel (PUCCH) of the terminal. If the network device indicates a common beam, the common beam may be used for uplink and downlink channels and/or reference signals of the terminal.

For the common beam used to indicate which channels and/or reference signals, it is indicated by a signaling or specified by a standard. This may be known by the terminal. However, how the common beam indicates the channels and/or reference signals remains to be studied.

A method for beam indication is provided in an embodiment of the present disclosure, in which indication of the common beam is realized by indicating one or more common transmission configuration indication (TCI) states through indication information.

In an embodiment, the common TCI state includes an uplink and downlink (UL & DL) common TCI state applicable to UL and DL, or a UL common TCI state applicable to UL and/or a DL common TCI state applicable to DL.

It may be understood that, the common TCI state involved in the embodiments of the present disclosure may be considered to be corresponding to the common beam. In the embodiments of the present disclosure, the common beam and the common TCI state are sometimes used interchangeably, the DL common beam and the DL common TCI state are sometimes used interchangeably, the UL common beam and the UL common TCI state are sometimes used interchangeably, and the UL common Beam may also be used interchangeably with UL common SpatialRelationInfo. Those skilled in the art should understand that their meanings are consistent.

For the convenience of description in the embodiments of the present disclosure, indication information used to indicate the common TCI state is referred to as first indication information.

FIG. 2 is a flowchart illustrating a method for beam indication according to an embodiment. As shown in FIG. 2, the method for beam indication is applied to a terminal and includes the following step.

At S11, first indication information is received. The first indication information is configured to indicate one or more common TCI states.

The common TCI state includes a UL & DL common TCI state applicable to UL and DL.

The common TCI state includes a UL common TCI state applicable to UL, or a DL common TCI state applicable to DL.

In an example, the first indication information may be used to indicate M DL common TCI states and/or N UL common TCI states, or L UL&DL common TCI states, where M is greater than or equal to 1, N is greater than or equal to 1, and L is greater than or equal to 1.

It may be understood that, in the embodiments of the present disclosure, M=1, N=1, and L=1 correspond to an indication of the common TCI state of a single TRP.

In the method for beam indication according to the embodiments of the present disclosure, an indication field of the first indication information is used to indicate the UL common TCI state and/or the DL common TCI state, or the UL&DL common TCI state. When the same TCI state is applicable to UL and DL, the first indication information needs to indicate the UL&DL common TCI state. When the UL and DL need to use different common TCI states, the first indication information sent for one time may indicate the DL common beam, or the UL common beam, or both the DL common beam and the UL common beam.

In an embodiment, the first indication information in the method for beam indication according to the embodiments of the present disclosure includes a first indication field. The first indication field is used to indicate the UL common TCI state.

In another embodiment, the first indication information in the method for beam indication according to the embodiments of the present disclosure includes a first indication field. The first indication field is used to indicate the UL&DL common TCI state.

In yet another embodiment, the first indication information in the method for beam indication according to the embodiments of the present disclosure includes a second indication field. The second indication field is used to indicate the UL&DL common TCI state.

In yet another embodiment, the first indication information in the method for beam indication according to the embodiments of the present disclosure includes the first and second indication fields, in which the first indication field is used to indicate the UL common TCI state and the second indication field is used to indicate the DL common TCI state.

The first indication field and the second indication field discussed in the embodiments of the present disclosure are described by taking the first indication field for indicating the UL common TCI state and the second indication field for indicating the DL common TCI state as an example. In the embodiments of the present disclosure, since the UL&DL common TCI state may not be indicated separately with the DL common beam, and may also not be indicated separately with the UL common beam, the first indication field may also be used to indicate the UL&DL common TCI state when there is no need to separately indicate the UL common beam, and similarly the second indication field may also be used to indicate the UL&DL common TCI state when there is no need to separately indicate the Dl common beam. That is, when only one UL&DL common TCI state is indicated, only one indication field is needed.

In the method for beam indication according to the embodiments of the present disclosure, the first indication field and the second indication field may be in the same DCI format or may be in different DCI formats.

In the method for beam indication according to the embodiments of the present disclosure, when the first indication field and the second indication field are in the same DCI format, the first indication field and the second indication field are different, that is, the indication field of the DL common TCI state is different from that of the UL common TCI state.

In an example, the indication field of the DL common TCI state is different from that of the UL common TCI state.

The first indication field and/or the second indication field may be an indication field of TCI used for PDSCH dedicated beam indication in a DCI signaling, an indication field for sounding reference signal (SRS) resource indication (SRS resource indicator for short) in the DCI signaling, or an indication field newly added in the DCI signaling. For example, in the DCI format used for downlink scheduling, the second indication field for indicating the DL common TCI state reuses the indication field of the TCI used for the PDSCH dedicated beam indication in the existing DCI signaling. The first indication field for indicating the UL common TCI state may be the indication field newly added in the DCI. That is, a new indication field for indicating the UL common beam is added in the DCI. For another example, different indication fields may be added to the DCI in the DCI format used for downlink scheduling or uplink scheduling. The DL common TCI state and the UL common TCI state respectively indicate the DL common beam and UL common TCI state by adding new indication fields. For another example, in the DCI format used for uplink scheduling, the first indication field for indicating the UL common TCI state reuses the indication field for SRS resource indication in the existing DCI signaling, and the second indication field for indicating the DL common TCI state may be the indication field newly added in the DCI.

In an implementation, in the method for beam indication according to the embodiments of the present disclosure, when the first indication field and the second indication field are in the same DCI format, the first indication field is the same as the second indication field, that is, the indication field of the DL common TCI state is the same as that of the UL common TCI state.

In an example, when the indication field of the DL common TCI state is the same as that of the UL common TCI state, the first indication field and the second indication field are represented by different bits.

The first indication field and/or the second indication field may be one or a combination of: an indication field of TCI for PDSCH dedicated beam indication in a DCI signaling; an indication field for sounding reference signal (SRS) resource indication in the DCI signaling; or an indication field newly added in the DCI signaling. For example, the indication field of DL common TCI state and UL common TCI state is reused with the TCI indication field used for PDSCH dedicated beam indication in the existing DCI signaling, and a number of bits may be greater than or equal to the existing number of bits (3 bits). However, the DL common TCI state and the UL common TCI state occupy different bits in the indication field.

In an implementation, the first indication field and the second indication field in the method for beam indication according to the embodiments of the present disclosure are in the same DCI format, the first indication field is the same as the second indication field, the first indication field and the second indication field are represented by different bit values of a same bit. The first indication field and/or the second indication field may be one or a combination of: an indication field of TCI for PDSCH dedicated beam indication in a DCI signaling; a SRS resource indicator in the DCI signaling; or an indication field newly added in the DCI signaling. For example, the indication field of DL common TCI state and UL common TCI state is reused with the TCI indication field used for PDSCH dedicated beam indication in the existing DCI signaling, the DL common TCI state and UL common TCI state occupy the same bit in the indication field, and the first indication field and the second indication field are represented by different bit values of a same bit (i.e., code point). It should be noted that, even if the indication field of the TCI for PDSCH dedicated beam indication or the SRS resource indicator is reused, a number of bits in the indication field may remain unchanged or be increased on the basis of the existing number of bits.

In an example, the DL common TCI state and the UL common TCI state in the method for beam indication according to the embodiments of the present disclosure are indicated by code points corresponding to different bit values. The first indication field and/or the second indication field may be one or a combination of: an indication field of TCI for PDSCH dedicated beam indication in a DCI signaling; a SRS resource indicator in the DCI signaling; or an indication field newly added in the DCI signaling. For example, a first bit value is used to represent the first indication field, and a second bit value is used to represent the second indication field. There is a first mapping relationship between the code point corresponding to the first bit value and the UL common TCI state, and/or there is a second mapping relationship between the code point corresponding to the second bit value and the DL common TCI state. Also, a code point corresponding to a third bit value may have a third mapping relationship with the UL common TCI state and the DL common TCI state.

In an example, the code point corresponding to the Bit value has a mapping relationship with the DL common TCI state and/or the UL common TCI state, and the mapping relationship is indicated by a medium access control (MAC) control element (CE).

For example, the indication field contains 3 bits, the code point 000 correspondingly indicates the DL common TCI state #0 and the UL common TCI state #1, the code point 001 correspondingly indicates the DL common TCI state #2, the code point 010 correspondingly indicates the UL common TCI state #3, and the code point 011 correspondingly indicates the DL common TCI state #4 and the UL common TCI state #5 . . . . Here, the numbering of DL common TCI state and UL common TCI state may be performed together or independently, without any limitation.

In the method for beam indication according to the embodiments of the present disclosure, the DCI sent for one time is used to indicate the DL common TCI state or the UL common TCI state. That is, the same DCI signaling may indicate the DL common TCI state or the UL common TCI state within the first time. Whether the DCI sent for one time indicates the DL common beam or the UL common beam is indicated in an implicit indication manner or an explicit indication manner.

It may be understood that, sending the DCI signaling once cannot indicate the DL common beam and the UL common beam at the same time. It is reasonable to update the DL common beam when there is downlink data to be transmitted, and update the UL common beam when there is uplink data to be transmitted.

In an example, whether the DCI sent for one time indicates the DL common beam or the UL common beam is indicated in the implicit indication manner. For example, when the DCI signaling in the DCI format used for downlink scheduling has indicated downlink resource scheduling, it may be understood as indicating the DL common beam; when the DCI signaling in the DCI format used for downlink scheduling has not indicated downlink resource scheduling, it may be understood as indicating the UL common beam. Alternatively, for example, the DCI signaling in the DCI format used for downlink scheduling indicates the DL common beam, and the DCI signaling in the DCI format used for uplink scheduling indicates the UL common beam.

In the method for beam indication according to the embodiments of the present disclosure, the first indication field and the second indication field are in different DCI formats, that is, the indication fields of DL common TCI state and UL common TCI state are in different DCI formats.

In an example, the indication field for indicating the DL common TCI state is in the DCI format for downlink scheduling, the TCI indication field for PDSCH dedicated beam indication in the existing DCI signaling may be reuses or a new indication field may be added. The indication field for indicating the UL common TCI state is in the DCI format for uplink scheduling, the SRS resource indicator in the existing DCI signaling may be reused or a new indication field used to indicate the UL common beam may be added.

In the method for beam indication according to the embodiments of the present disclosure, the first indication field and the second indication field are in different DCI formats, and the DCI sent for one time is used to indicate the DL common TCI state or the UL common TCI state. That is, the same DCI signaling may indicate the DL common TCI state or the UL common TCI state within the first time. The DL common beam may be indicated when there is downlink transmission, and the UL common beam may be indicated when there is uplink transmission.

In the method for beam indication according to the embodiments of the present disclosure, a channel and/or a reference signal to which the common TCI state is applicable may be indicated through indication information.

For convenience of description, the indication information used to indicate the channel and/or reference signal to which the common TCI state is applicable is referred to as second indication information.

FIG. 3 is a flowchart illustrating a method for beam indication according to an embodiment. As shown in FIG. 3, the method for beam indication is applied to a terminal, and the method may be executed alone or executed together in combination with other methods in the embodiments of the present disclosure. The method includes the following step.

At S21, second indication information is received, in which the second indication information is configured to indicate a channel and/or a reference signal to which the common TCI state is applicable.

The second indication information may be a radio resource control (RRC) signaling, or a MAC CE signaling.

In an example, the terminal instructs through the RRC signaling and/or MAC CE signaling that, the DL common TCI state is used to indicate which beams perform downlink transmission. For example, it is instructed through the RRC signaling and/or MAC CE signaling that the DL common TCI state is used to indicate a beam of at least two items among the PDCCH, PDSCH, physical broadcast channel (PBCH), synchronization signal block (SSB), demodulation reference signal (DMRS), channel state information reference signal (CSI-RS), positioning reference signals (PRS), tracking reference signals (TRS), etc. For another example, the terminal instructs a reference signal (such as CSI-RS) through the RRC signaling and/or MAC CE signaling, and may also instruct the application/purpose of the reference signal, such as CSI-RS for beam measurement, or CSI-RS for channel state information measurement, etc. For another example, for a channel, it may also be instructed whether it is applicable to all transmissions of the channel or only applicable to the UE specific part of the channel. For example, for the PDCCH, it may also be instructed whether it is applicable to all PDCCHs or only applicable to UE-specific PDCCHs.

In another example, when used for uplink transmission, the second indication information instructs that the UL common TCI state is used to indicate which beams for uplink transmission. For example, the RRC signaling and/or MAC CE signaling indicates a beam of at least two items among the PUCCH, PUSCH, physical random access channel (PRACH), SRS, and DMRS. Similarly, for a reference signal (e.g., SRS), it may also indicate the purpose of the reference signal, such as, SRS for beam measurement, SRS for codebook based channel state information measurement, SRS for non-codebook based channel state information measurement, SRS for antenna switching, or SRS for positioning measurement, etc.

In another embodiment, the second indication information may also instruct that the DL common TCI state is used to indicate which beams for uplink and downlink transmission. For example, it is instructed through RRC signaling and/or MAC CE signaling that the UL & DL common TCI state is used to indicate a beam of at least two items among the PDCCH, PDSCH, PUCCH, PUSCH, PRACH, PBCH, SSB, DMRS, CSI-RS, PRS, TRS, SRS, etc. For another example, the terminal instructs through the RRC signaling and/or MAC CE signaling, a reference signal (e.g., CSI-RS) and its purpose, such as CSI-RS for beam measurement, or CSI-RS for channel state information measurement. For example, similarly for the SRS, the terminal instructs the purpose of SRS, such as SRS for beam measurement, SRS for codebook based channel state information measurement, SRS for non-codebook based channel state information measurement, SRS for antenna switching, or SRS for positioning measurement, etc. For another example, for a channel, it may also be instructed whether it is applicable to all transmissions of the channel or only applicable to the UE specific part of the channel. For example, for the PDCCH, it may also be instructed whether it is applicable to all PDCCHs or only applicable to UE-specific PDCCHs.

The method for beam indication according to the embodiments of the present disclosure indicates the common TCI state for a single TRP or a plurality of TRPs. That is, the common TCI state may be indicated for the single TRP or the plurality of TRPs through the first indication information. That is, one or more common TCI states are TCI states of the same TRP. Alternatively, one or more common TCI states are TCI states of the plurality of TRPs.

In the method for beam indication according to the embodiments of the present disclosure, the indication information instructs that the first indication information is used to indicate a common TCI state of one TRP, or the first indication information is used to indicate common TCI states of the plurality of TRPs.

For convenience of description, the indication information for instructing that the first indication information indicates the common TCI state of one or more TRPs is called third indication information.

FIG. 4 is a flowchart illustrating a method for beam indication according to an embodiment. As shown in FIG. 4, the method for beam indication is applied to the terminal, and the method may be executed alone or executed together in combination with other methods in the embodiments of the present disclosure. The method includes the following steps.

At S31, third indication information is received, in which the third indication information is configured to indicate that the first indication information indicates common TCI states of one or more TRPs.

In the method for beam indication according to the embodiments of the present disclosure, the third indication information is configured to instruct that the first indication information is used to indicate a common TCI state of a single TRP, i.e., at most one DL common TCI state, at most one UL common TCI state, at most one UL&DL common TCI state. When the third indication information is configured to instruct that the first indication information is used to indicate a plurality of TRPs, it may need to indicate a plurality of DL common TCI states, a plurality of UL common TCI states, and a plurality of UL&DL common TCI states.

In an example, the third indication information instructs that the first indication information is used to indicate indication fields of the plurality of DL common TCI states are the same as that of the single DL common TCI state. For whether a code point of the indication field corresponds to one or two DL common TCI states, the MAC CE provides a corresponding relationship between the code point and one or two DL common TCI states, which is similar to the above description.

In another example, the third indication information instructs that the first indication information is used to indicate indication fields of the plurality of UL common TCI states are the same as that of the single UL common TCI state. For whether a code point of the indication field corresponds to one or two UL common TCI states, the MAC CE provides a corresponding relationship between the code point and one or two UL common TCI states, which is similar to the above description.

In another example, the third indication information instructs that the first indication information is used to indicate indication fields of the plurality of UL&DL common TCI states are the same as that of the single UL&DL common TCI state. For whether a code point of the indication field corresponds to one or two UL&DL common TCI states, the MAC CE provides a corresponding relationship between the code point and one or two UL&DL common TCI states, which is similar to the above description.

In the method for beam indication according to the embodiments of the present disclosure, indication information may be used to instruct whether to use one UL&DL common TCI state, or whether to use the DL common TCI state and the UL common TCI state for separate indication. It can also be understood that the terminal receives fourth indication information, in which the fourth indication information is configured to instruct that the first indication information is used to indicate at least one of the UL&DL common TCI state, the DL common TCI state, and the UL common TCI state.

In an example, the fourth indication information may be the RRC signaling and/or MAC signaling.

For example, the RRC signaling and/or the MAC signaling instructs whether to use one common TCI state, or whether to use the DL common TCI state and the UL common TCI state for separate indication. For example, the MAC CE signaling must activate X TCI states, and may optionally activate Y TCI states, where bit positions for activating the X TCI states are different from those for activating the Y TCI states. When only the X TCI states are activated, it means the common TCI state, i.e., a joint DL/UL beam indication, which means that each TCI state in the X TCI states may be used for uplink and downlink. When the Y TCI states are also activated, it means separate DL/UL beam indication, where the X TCI states are used for DL and the Y TCI states are used for UL. X and Y values may be the same. At the same time, the RRC and/or MAC signaling instructs at least one item of a of bit field position and a number of bits used for common TCI state indication in the DCI under different circumstances.

The method for beam indication according to the embodiments of the present disclosure reduces the signaling overhead through the common beam indication, and realizes separate indication of the DL common beam and the UL common beam, and a dynamic indication method of the DL common TCI state and the UL common TCI state. The DCI format corresponding to the DL common beam and the UL common beam, the indication field in the DCI signaling, and the indication meaning of the code point of the DCI signaling are included. Through the method for beam indication according to the present disclosure, the reliability of DCI signaling is improved and the signaling overhead of beam indication is reduced.

FIG. 5 is a flowchart illustrating a method for beam indication according to an embodiment. As shown in FIG. 5, the method for beam indication is applied to a network device and includes the following steps.

At S41, first indication information is sent, in which the first indication information is configured to indicate one or more common TCI states.

The common TCI state includes a UL & DL common TCI state applicable to UL and DL.

The common TCI state includes a UL common TCI state applicable to UL, or a DL common TCI state applicable to DL.

In an embodiment, an indication field of the first indication information indicates the UL common TCI state and/or the DL common TCI state, or the UL&DL common TCI state.

In an embodiment, the first indication information in the method for beam indication according to the embodiments of the present disclosure includes a first indication field. The first indication field is used to indicate the UL common TCI state or the UL&DL common TCI state.

In another embodiment, the first indication information in the method for beam indication according to the embodiment of the present disclosure includes a second indication field. The second indication field is used to indicate the DL common TCI state or the UL&DL common TCI state.

In yet another embodiment, the first indication information in the method for beam indication according to the embodiments of the present disclosure includes a first indication field and a second indication field, where the first indication field is used to indicate the UL common TCI state or the UL&DL common TCI state, the second indication field is used to the indicate DL common TCI state or the UL&DL common TCI state.

In an implementation, the first indication field and the second indication field in the method for beam indication according to the embodiments of the present disclosure are in the same DCI format.

In an implementation, in the method for beam indication according to the embodiments of the present disclosure, the first indication field is different from the second indication field.

In an implementation, in the method for beam indication according to the embodiments of the present disclosure, the first indication field is the same as the second indication field.

In an embodiment, in the method for beam indication according to the embodiments of the present disclosure, the first indication field is the same as the second indication field, and the first indication field and the second indication field are represented by different bits.

In another embodiment, in the method for beam indication according to the embodiments of the present disclosure, the first indication field is the same as the second indication field, and the first indication field and the second indication field are represented by different bit values of a same bit.

In an implementation, a first bit value is used to represent the first indication field, and a second bit value is used to represent the second indication field. There is a first mapping relationship between the code point corresponding to the first bit value and the UL common TCI state, and/or there is a second mapping relationship between the code point corresponding to the second bit value and the DL common TCI state. and/or a code point corresponding to a third bit value may have a third mapping relationship with the UL common TCI state and the DL common TCI state.

In an implementation, in the method for beam indication according to the embodiments of the present disclosure, the first indication field and the second indication field are in different DCI formats.

In an embodiment, the first indication field and/or the second indication field may be one or a combination of: the indication field of TCI for PDSCH dedicated beam indication in the DCI signaling; the SRS resource indicator in the DCI signaling; and the indication field newly added in the DCI signaling.

In an embodiment, the DCI sent for one time is used to indicate the DL common TCI state or the UL common TCI state or the UL&DL common TCI state.

FIG. 6 is a flowchart illustrating a method for beam indication according to an embodiment. As shown in FIG. 6, the method for beam indication is applied to the network device, and the method may be executed alone or executed together in combination with other methods in the embodiments of the present disclosure. The method includes the following step.

At S51, second indication information is sent, in which the second indication information is configured to indicate a channel and/or a reference signal to which the common TCI state is applicable.

The second indication information may be the RRC signaling or the MAC CE signaling.

In an example, the terminal instructs through the RRC signaling and/or MAC CE signaling that, the DL common TCI state is used to indicate which beams perform downlink transmission, and/or the UL common TCI state is used to indicate which beams perform uplink transmission. And/or, the second indication information may also instruct the UL & DL common TCI state is used to indicate which beams perform uplink and downlink transmission.

The method for beam indication according to the embodiments of the present disclosure indicates the common TCI state for a single TRP or a plurality of TRPs. That is, the common TCI state may be indicated for the single TRP or the plurality of TRPs through the first indication information. That is, one or more common TCI states are TCI states of the same TRP. Alternatively, one or more common TCI states are TCI states of multiple TRPs.

FIG. 7 is a flowchart illustrating a method for beam indication according to an embodiment. As shown in FIG. 7, the method for beam indication is applied to the network device, and the method may be executed alone or executed together in combination with other methods in the embodiments of the present disclosure. The method includes the following step.

At S61, third indication information is sent, in which the third indication information is configured to instruct that the first indication information is used to indicate common TCI states of one or more TRPs.

The third indication information is configured to instruct that the first indication information is used to indicate a common TCI state of a single TRP, i.e., at most one DL common TCI state, at most one UL common TCI state, and at most one UL&DL common TCI state. When the third indication information is configured to instruct that the first indication information is used to indicate a plurality of TRPs, it may need to indicate a plurality of DL common TCI states, a plurality of UL common TCI states, and a plurality of UL&DL common TCI states.

In the method for beam indication according to the embodiments of the present disclosure, indication information may be used to instruct whether to use one UL&DL common TCI state, or whether to use the DL common TCI state and the UL common TCI state for separate indication. It can also be understood that the network device sends fourth indication information, in which the fourth indication information is configured to instruct that the first indication information is used to indicate at least one of the UL&DL common TCI state, the DL common TCI state, and the UL common TCI state.

In an example, the fourth indication information may be the RRC signaling and/or MAC signaling.

The method for beam indication according to the embodiments of the present disclosure reduces the signaling overhead through the common beam indication, and realizes separate indication of the DL common beam and the UL common beam, and a dynamic indication method of the DL common TCI state and the UL common TCI state. The DCI format corresponding to the DL common beam and the UL common beam, the indication field in the DCI signaling, and the indication meaning of the code point of the DCI signaling are included. Through The method for beam indication according to the present disclosure, the reliability of DCI signaling is improved and the signaling overhead of beam indication is reduced.

It may be understood that, for the common beam indication, the method for beam indication applied to the network device according to the embodiments of the present disclosure is similar to that applied to the terminal, which will not be repeated here.

It may be further understood that, the method for beam indication according to the embodiments of the present disclosure may be applied to an implementation process in which the terminal and the network device interact to perform beam indication. In the method for beam indication interactively between the terminal and the network device, the terminal and the network device each have relevant functions for implementing the foregoing embodiments, which will not be repeated here.

It should be noted that, those skilled in the art may understand that the various implementations/embodiments mentioned above in the embodiments of the present disclosure may be used in conjunction with the foregoing embodiments, or may be used independently. Whether it is used alone or in combination with the foregoing embodiments, its implementation principles are similar. In the implementation of the present disclosure, some embodiments are described in the manner of being used together. Those skilled in the art may understand that such illustration does not limit the embodiments of the present disclosure.

Based on the same concept, the embodiments of the present disclosure further provide an apparatus for beam indication.

It may be understood that, in order to realize the above functions, the apparatus for beam indication according to the embodiments of the present disclosure includes corresponding hardware structures and/or software modules for performing various functions. Combining the units and algorithm steps of each example disclosed in the embodiments of the present disclosure, the embodiments of the present disclosure may be implemented in the form of hardware or a combination of hardware and computer software. Whether a certain function is executed by hardware or computer software drives hardware depends on specific applications and design constraints of the technical solution. Those skilled in the art may use different methods to implement the described functions for each specific application, but such implementation should not be regarded as exceeding the scope of the technical solutions according to the embodiments of the present disclosure.

FIG. 8 is a block diagram of an apparatus for beam indication according to an embodiment. Referring to FIG. 8, the apparatus for beam indication 100 is applied to a terminal and includes a receiving unit 101.

The receiving unit 101 is configured to receive first indication information. The first indication information is configured to indicate one or more common transmission configuration indication (TCI) states, the common TCI state includes an uplink and downlink (UL & DL) common TCI state applicable to UL and DL, or a UL common TCI state applicable to UL and/or a DL common TCI state applicable to DL In an implementation, the first indication information includes a first indication field and/or a second indication field, the first indication field is configured to indicate the UL common TCI state or the UL & DL common TCI state, and the second indication field is configured to indicate the DL common TCI state or the UL & DL common TCI state.

In an implementation, the first indication field and the second indication field are in a same downlink control information (DCI) format.

In an implementation, the first indication field is different from the second indication field.

In an implementation, the first indication field is the same as the second indication field.

In an implementation, the first indication field and the second indication field are represented by different bits.

In an implementation, the first indication field and the second indication field are represented by different bit values of a same bit.

In an implementation, a code point corresponding to a first bit value has a first mapping relationship with the UL common TCI state, and/or a code point corresponding to a second bit value has a second mapping relationship with the DL common TCI state. The first bit value is used to represent the first indication field. The second bit value is used to represent the second indication field.

In an implementation, the first indication field and the second indication field are in different DCI formats.

In an implementation, the first indication field and/or the second indication field are one or a combination of: an indication field of TCI for physical downlink shared channel (PDSCH) dedicated beam indication in a DCI signaling; an indication field for sounding reference signal (SRS) resource indication in the DCI signaling; or an indication field newly added in the DCI signaling.

In an implementation, the DCI signaling sent for one time is configured to indicate the UL & DL common TCI state, or the UL common TCI state, or the DL common TCI state.

In an implementation, the receiving unit 101 is further configured to: receive second indication information, in which the second indication information is configured to indicate a channel and/or a reference signal to which the common TCI state is applicable.

In an implementation, the one or more common TCI states include TCI states of a same transmission and reception point (TRP).

In an implementation, the one or more common TCI states include TCI states of one or more TRPs.

In an implementation, the receiving unit 101 is further configured to: receive third indication information, in which the third indication information is configured to instruct that the first indication information indicates common TCI states of the one or more TRPs.

In an implementation, the receiving unit 101 is further configured to: receive fourth indication information, in which the fourth indication information is configured to indicate that the first indication information indicates at least one of: the UL & DL common TCI state, the UL common TCI state or the DL common TCI state.

FIG. 9 is a block diagram illustrating an apparatus for beam indication according to an embodiment. Referring to FIG. 9, the apparatus for beam indication 200 is applied to a network device, and the apparatus for beam indication 200 includes a sending unit 201.

The sending unit 201 is configured to send first indication information, in which the first indication information is configured to indicate one or more common TCI states, the common TCI state includes a UL & DL common TCI state applicable to UL and DL, or a UL common TCI state applicable to UL and/or a DL common TCI state applicable to DL.

In an implementation, the first indication information includes a first indication field and/or a second indication field, the first indication field is configured to indicate the UL common TCI state or the UL & DL common TCI state, and the second indication field is configured to indicate the DL common TCI state or the UL & DL common TCI state.

In an implementation, the first indication field and the second indication field are in a same DCI format.

In an implementation, the first indication field is different from the second indication field.

In an implementation, the first indication field is the same as the second indication field.

In an implementation, the first indication field and the second indication field are represented by different bits.

In an implementation, the first indication field and the second indication field are represented by different bit values of a same bit.

In an implementation, a code point corresponding to a first bit value has a first mapping relationship with the UL common TCI state, and/or a code point corresponding to a second bit value has a second mapping relationship with the DL common TCI state. The first bit value is used to represent the first indication field. The second bit value is used to represent the second indication field.

In an implementation, the first indication field and the second indication field are in different DCI formats.

In an implementation, the first indication field and/or the second indication field are one or a combination of:

an indication field of TCI for physical downlink shared channel (PDSCH) dedicated beam indication in a DCI signaling; an indication field for sounding reference signal (SRS) resource indication in the DCI signaling; or an indication field newly added in the DCI signaling.

In an implementation, the DCI signaling sent for one time is configured to indicate the UL & DL common TCI state, or the UL common TCI state, or the DL common TCI state.

In an implementation, the sending unit 201 is further configured to send second indication information, in which the second indication information is configured to indicate a channel and/or a reference signal to which the common TCI state is applicable.

In an implementation, the one or more common TCI states include TCI states of a same TRP.

In an implementation, the one or more common TCI states include TCI states of one or more TRPs.

In an implementation, the sending unit 201 is further configured to: send third indication information, in which the third indication information is configured to instruct that the first indication information indicates the common TCI states of one or more TRPs.

In an embodiment, the sending unit 201 is further configured to: send fourth indication information, in which the fourth indication information is configured to indicate that the first indication information indicates at least one of: the UL & DL common TCI state, the UL common TCI state or the DL common TCI state.

Regarding the apparatus in the foregoing embodiments, the specific manner in which each module executes operations has been described in detail in the embodiments related to the method, which will not be described in detail here.

FIG. 10 is a block diagram illustrating a device for beam indication according to an embodiment. For example, the device 300 may be a mobile phone, a computer, a digital broadcast terminal, a messaging device, a game console, a tablet device, a medical device, a fitness device, a personal digital assistant, and the like.

Referring to FIG. 10, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls overall operations of the device 300, such as those associated with display, telephone calls, data communications, camera operations, and recording operations. The processing component 302 may include one or more processors 320 to execute instructions to complete all or part of the steps of the methods described above. Moreover, the processing component 302 may include one or more modules that facilitate interactions between the processing component 302 and other components. For example, the processing component 302 may include a multimedia module to facilitate interactions between the multimedia component 308 and the processing component 302.

The memory 304 is configured to store various types of data to support operations at the device 300. Examples of such data include instructions for any application or method operating on the device 300, contact data, phonebook data, messages, pictures, videos, and the like. The memory 304 may be implemented by any type of volatile or non-volatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 306 provides power to various components of the device 300. The power components 306 may include a power management system, one or more power supplies, and other components associated with the generation, management, and distribution of power in the device 300.

The multimedia component 308 includes a screen that provides an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 308 includes a front camera and/or a rear camera. When the device 300 is in an operation mode, such as a shooting mode or a video mode, the front camera and/or the rear camera can receive external multimedia data.

Each front camera and rear camera may be a fixed optical lens system or have focal length and optical zoom capability.

The audio component 310 is configured to output and/or input audio signals. For example, the audio component 310 includes a microphone (MIC), which is configured to receive external audio signals when the device 300 is in operation modes, such as a call mode, a recording mode and a voice recognition mode. The received audio signals may be further stored in the memory 304 or sent via the communication component 316. In some embodiments, the audio component 310 also includes a speaker for outputting audio signals.

The I/O interface 312 provides an interface between the processing component 302 and a peripheral interface module, which may be a keyboard, a click wheel, a button, and the like. These buttons may include, but are not limited to: a home button, volume buttons, a start button, and a lock button.

The sensor component 314 includes one or more sensors for providing various aspects of status assessment for the device 300. For example, the sensor component 314 may detect an open/closed state of the device 300, relative positioning of components, such as the display and keypad, of the device 300, a change in the position of the device 300 or a component of the device 300, a presence or absence of user contact with the device 300, an orientation or an acceleration/deceleration of the device 300 and a change in temperature of the device 300. The sensor component 314 may include a proximity sensor configured to detect the presence of nearby objects in the absence of any physical contact. The sensor component 314 may also include an optical sensor, such as a complementary metal oxide semiconductor (CMOS) or a charge-coupled device (CCD) image sensor, for use in imaging applications. In some embodiments, the sensor component 314 may also include an acceleration sensor, a gyroscope sensor, a magnetic sensor, a pressure sensor or a temperature sensor.

The communication component 316 is configured to facilitate wired or wireless communication between the device 300 and other devices. The device 300 can access wireless networks based on communication standards, such as WiFi, 2G or 3G, or their combination. In an embodiment, the communication component 316 receives broadcast signals or broadcast related information from an external broadcast management system via a broadcast channel. In an embodiment, the communication component 316 also includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In an embodiment, there is also provided a non-transitory computer-readable storage medium including instructions, such as the memory 304 including instructions, which may be executed by the processor 320 of the device 300 to implement the above method. For example, the non-transitory computer readable storage medium may be a ROM, a random access memory (RAM), a CD-ROM, a magnetic tape, a floppy disc, an optical data storage device, and the like.

FIG. 11 is a block diagram illustrating a device for beam indication according to an embodiment. For example, the device 400 may be provided as a network device. Referring to FIG. 11, the device 400 includes a processing component 422, which further includes one or more processors, and a memory resource represented by a memory 432 for storing instructions executable by the processing component 422, such as application programs. The application program stored in the memory 432 may include one or more modules each corresponding to a set of instructions. In addition, the processing component 422 is configured to execute instructions to perform the above method.

The device 400 may also include a power component 426 configured to perform power management of the device 400, a wired or wireless network interface 450 configured to connect the device 400 to a network, and an input/output (I/O) interface 458. The device 400 may operate based on an operating system stored in the memory 432, such as Windows Server™, Mac OS X™, Unix™, Linux™, FreeBSD™ or the like.

In an embodiment, there is also provided a non-transitory computer-readable storage medium including instructions, such as the memory 432 including instructions, which may be executed by the processing component 422 of the device 400 to implement the above method. For example, the non-transitory computer readable storage medium may be a ROM, a random access memory (RAM), a CD-ROM, a magnetic tape, a floppy disc, an optical data storage device, and the like.

The technical solutions according to the embodiments of the present disclosure may include the following beneficial effects: the network device sends first indication information, and the terminal receives the first indication information. The first indication information is used to indicate one or more common TCI states, and the common TCI state includes a UL & DL common TCI state applicable to UL and DL, or a UL common TCI state applicable to UL and/or a DL common TCI state applicable to DL. In this way, it is achieved that indication of the common TCI states and the signaling overhead is saved.

It may be further understood that, "a plurality of" in present disclosure refers to two or more, to which other quantifiers are similar. "And/or" describes an association relationship between associated objects, indicating that there may be three types of relationships. For example, A and/or B may indicate: A exists alone, A and B exist simultaneously, and B exists independently. The character "/" generally indicates that the contextual objects are in an "or" relationship. The singular forms "a/an", "said" and "the" are also intended to include the plural forms unless the context clearly dictates otherwise.

It may be further understood that, the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the present disclosure, first information may also be called second information, and similarly, second information may also be called first information.

It may be further understood that, although operations are described in a specific order in the drawings in the embodiments of the present disclosure, it should not be understood as requiring these operations are performed in the specific order shown or in a serial order, or requiring all the operations are performed to obtain a desired result. In certain circumstances, multitasking and parallel processing may be advantageous.

Those skilled in the art will be aware of other implementations of the embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope of the disclosure are indicated in the following claims.

It should be understood that the disclosure are not limited to the precise structures described above and illustrated in the accompanying drawings, and that various modifications and changes may be made without departing from its scope. The scope of the disclosure is limited only by the appended claims.

The invention claimed is:

1. A method for beam indication, performed by a terminal, the method comprising:

receiving first indication information, wherein the first indication information is configured to indicate one or more common transmission configuration indication (TCI) states, the common TCI state comprises an uplink and downlink (UL & DL) common TCI state applicable to UL and DL, or at least one of a UL common TCI state applicable to UL or a DL common TCI state applicable to DL;

wherein the first indication information comprises at least one of a first indication field or a second indication field, the first indication field is configured to indicate the UL common TCI state or the UL & DL common TCI state, and the second indication field is configured to indicate the DL common TCI state or the UL & DL common TCI state;

wherein the first indication field and the second indication field are in a same downlink control information (DCI) format, and the first indication field is the same as the second indication field;

wherein when the first indication field is the same as the second indication field, the first indication field and the second indication field are represented by different bit values of a same bit; and a code point corresponding to a first bit value has a first mapping relationship with the UL common TCI state, and/or a code point corresponding to a second bit value has a second mapping relationship with the DL common TCI state.

2. The method of claim 1, wherein the first indication field and the second indication field are in different downlink control information (DCI) formats;

wherein at least one of the first indication field or the second indication field is at least one of: an indication field of TCI for physical downlink shared channel (PDSCH) dedicated beam indication in a DCI signaling; an indication field for sounding reference signal (SRS) resource indication in the DCI signaling; or a new indication field in the DCI signaling.

3. The method of claim 1, wherein a DCI signaling sent for one time is configured to indicate the UL & DL common TCI state, or the UL common TCI state, or the DL common TCI state.

4. The method of claim 1, further comprising:

receiving second indication information, wherein the second indication information is configured to indicate at least one of a channel or a reference signal to which the common TCI state is applicable.

5. The method of claim 1, wherein the one or more common TCI states comprise TCI states of a same transmission and reception point (TRP) or TCI states of multiple TRPs.

6. The method of claim 5, further comprising:

receiving third indication information, wherein the third indication information is configured to indicate that the first indication information indicates common TCI states of one or more TRPs; and receiving fourth indication information, wherein the fourth indication information is configured to indicate that the first indication information indicates at least one of: the UL & DL common TCI state, the UL common TCI state or the DL common TCI state.

7. A method for beam indication, performed by a network device, the method comprising:

sending first indication information, wherein the first indication information is configured to indicate one or more common transmission configuration indication (TCI) states, the common TCI state comprises an uplink and downlink (UL & DL) common TCI state applicable to UL and DL, or at least one of a UL common TCI state applicable to UL or a DL common TCI state applicable to DL;

wherein the first indication information comprises at least one of a first indication field or a second indication field, the first indication field is configured to indicate the UL common TCI state or the UL & DL common TCI state, and the second indication field is configured to indicate the DL common TCI state or the UL & DL common TCI state;

wherein the first indication field and the second indication field are in a same downlink control information (DCI) format, and the first indication field is the same as the second indication field;

wherein when the first indication field is the same as the second indication field, the first indication field and the second indication field are represented by different bit values of a same bit; and a code point corresponding to a first bit value has a first mapping relationship with the UL common TCI state, and/or a code point corresponding to a second bit value has a second mapping relationship with the DL common TCI state.

8. The method of claim 7, wherein the first indication field and the second indication field are in different downlink control information (DCI) formats;

wherein at least one of the first indication field or the second indication field is at least one of: an indication field of TCI for physical downlink shared channel (PDSCH) dedicated beam indication in a DCI signaling; an indication field for sounding reference signal (SRS) resource indication in the DCI signaling; or a new indication field in the DCI signaling.

9. The method of 7, wherein a DCI signaling sent for one time is configured to indicate the UL & DL common TCI state, or the UL common TCI state, or the DL common TCI state.

10. The method of claim 7, further comprising:

sending second indication information, wherein the second indication information is configured to indicate at least one of a channel or a reference signal to which the common TCI state is applicable.

11. The method of claim 7, wherein the one or more common TCI states comprise TCI states of a same transmission and reception point (TRP) or TCI states of multiple TRPs.

12. The method of claim 11, further comprising:

sending third indication information, wherein the third indication information is configured to indicate that the first indication information indicates common TCI states of one or more TRPs; and sending fourth indication information, wherein the fourth indication information is configured to indicate that the first indication information indicates at least one of: the UL & DL common TCI state, the UL common TCI state or the DL common TCI state.

13. A terminal, comprising:

a processor; and a memory storing instructions executable by the processor;

wherein the processor is configured to:

receive first indication information, wherein the first indication information is configured to indicate one or more common transmission configuration indication (TCI) states, the common TCI state comprises an uplink and downlink (UL & DL) common TCI state applicable to UL and DL, or at least one of a UL common TCI state applicable to UL or a DL common TCI state applicable to DL;

wherein the first indication information comprises at least one of a first indication field or a second indication field, the first indication field is configured to indicate the UL common TCI state or the UL & DL common TCI state, and the second indication field is configured to indicate the DL common TCI state or the UL & DL common TCI state;

wherein the first indication field and the second indication field are in a same downlink control information (DCI) format, and the first indication field is the same as the second indication field;

wherein when the first indication field is the same as the second indication field, the first indication field and the second indication field are represented by different bit values of a same bit; and a code point corresponding to a first bit value has a first mapping relationship with the UL common TCI state, and/or a code point corresponding to a second bit value has a second mapping relationship with the DL common TCI state.

14. A network device, comprising:

a processor; and a memory storing instructions executable by the processor;

wherein the processor is configured to execute the method for beam indication according to claim 7.

\* \* \* \* \*